United States Patent

Wagner et al.

Patent Number: 5,579,389
Date of Patent: Nov. 26, 1996

[54] HISTOGRAM-BASED PROCESSING OF AUDIO SIGNALS

[75] Inventors: Larry Wagner, Oakland, Calif.; Robert A. Marshall, Portland, Oreg.

[73] Assignee: Intel Corporation, Santa Clara, Calif.

[21] Appl. No.: 359,468

[22] Filed: Dec. 20, 1994

Related U.S. Application Data

[63] Continuation-in-part of Ser. No. 342,270, Nov. 16, 1994, which is a continuation-in-part of Ser. No. 340,172, Nov. 15, 1994, which is a continuation-in-part of Ser. No. 157,694, Nov. 24, 1993, Pat. No. 5,506,954.

[51] Int. Cl.⁶ ................................. H04M 3/56
[52] U.S. Cl. ............ 379/388; 379/389; 379/390; 379/202; 379/409; 395/800
[58] Field of Search ................. 379/388, 420, 379/389, 390, 391; 395/162, 200, 800; 381/98

[56] References Cited

U.S. PATENT DOCUMENTS

| | | | |
|---|---|---|---|
| 4,475,193 | 10/1984 | Brown | 379/124 |
| 4,724,540 | 2/1988 | Pace et al. | 379/389 |
| 4,766,600 | 8/1988 | Martin | 375/10 |
| 4,879,745 | 11/1989 | Arbel | 379/389 |
| 4,888,795 | 12/1989 | Ando et al. | 379/53 |
| 4,998,243 | 3/1991 | Kao | 370/62 |
| 5,014,267 | 5/1991 | Tompkins et al. | 370/62 |
| 5,048,082 | 9/1991 | Krafft | 379/389 |
| 5,056,136 | 10/1991 | Smith | 380/10 |
| 5,072,442 | 12/1991 | Todd | 370/62 |
| 5,073,926 | 12/1991 | Suzuki et al. | 379/53 |
| 5,157,491 | 10/1992 | Kassatly | 358/146 |
| 5,187,741 | 2/1993 | Erving et al. | 379/406 |
| 5,218,680 | 6/1993 | Farrell et al. | 395/325 |
| 5,231,492 | 7/1993 | Dangi et al. | 358/143 |
| 5,271,057 | 12/1993 | Addeo et al. | 379/202 |
| 5,315,633 | 5/1994 | Champa | 348/16 |
| 5,319,704 | 6/1994 | Robinson | 379/389 |
| 5,319,793 | 6/1994 | Hancock et al. | 395/800 |
| 5,333,133 | 7/1994 | Andrews et al. | 370/58.2 |
| 5,335,321 | 8/1994 | Harney et al. | 395/162 |
| 5,353,348 | 10/1994 | Sendyk et al. | 379/410 |
| 5,367,629 | 11/1994 | Chu et al. | 395/162 |
| 5,374,952 | 12/1994 | Flohr | 348/12 |
| 5,375,068 | 12/1994 | Palmer et al. | 364/514 |
| 5,384,598 | 1/1995 | Rodriguez et al. | 348/384 |
| 5,384,772 | 1/1995 | Marshall | 370/60 |
| 5,392,223 | 2/1995 | Caci | 364/514 |
| 5,434,912 | 7/1995 | Boyer et al. | 379/202 |
| 5,434,913 | 7/1995 | Tung et al. | 379/202 |
| 5,493,568 | 2/1996 | Sampat | 370/60 |

FOREIGN PATENT DOCUMENTS 0523629  7/1992  European Pat. Off. .

OTHER PUBLICATIONS

Nakamura et al., "Personal Multimedia Teleconferencing Terminal." IEEE International Conference on Communications ICC 90–Session 211. vol. 1, 15 Apr. 1990, Atlanta (US).

Maeno et al., "Distributed Desktop Conferencing System (Mermaid) Based on Group Communication Architecture." IEICE Transactions. vol. E74, No. 9, Sep. 1991, Tokyo JP.

Tanigawa et al, "Personal Multimedia–Multipoint Teleconference System." IEEE Infocom 91 Conference on Computer Communications Session 9D, vol. 3, 7 Apr. 1991, Bal Harbour (US).

(List continued on next page.)

*Primary Examiner*—Krista M. Zele
*Assistant Examiner*—Jacques M. Saint-Surin
*Attorney, Agent, or Firm*—Steve Mendelsohn; William H. Murray

[57] ABSTRACT

A local histogram is generated with a controller based on local audio signals generated with a local microphone. A level of transmit attenuation and a level of receive attenuation are generated with the controller based on the local histogram. The local audio signals are attenuated with a transmit attenuator at the level of transmit attenuation for transmission to a remote node. Remote audio signals received from the remote node are attenuated with a receive attenuator at the level of receive attenuation for playback at a local speaker.

28 Claims, 7 Drawing Sheets

AUDIO SYSTEM

OTHER PUBLICATIONS

Computer Conferencing: IBM Scientists Demo Prototype of Affordable Computer Conferencing System, Nov. 2, 1992. Edge, on & about AT&T, V7, n223, p. 22.

Chen et al., "A Multimedia Desktop Collaboration System", Globecom 92—EEE Global Telecommunications Conference, vol. 2, 6 Dec. 1992–9 Dec. 1992. Orlando (US).

Vin et al., "Multimedia Conferencing in the Etherphone Environment", Computer, vol. 24, No. 10, Oct. 1991. Long Beach (US).

Eleftheriadis et al., "Algorithms and Performance Evaluation of the Xphone Multimedia Communication System". ACM Multimedia 93–Proceedings First ACM International Conference on Multimedia, 1 Aug. 1993, Anaheim (US).

Zhang et al., "Video Communication on LANs—Multimedia CSCW Applications." CCECE/CCGEI '93.

Ramanathan et al., "Integrating Virtual Reality, Tele-Conferencing, and Entertainment into Multimedia Home Computers". IEEE Transactions on Consumer Electronics, vol. 38, No. 2, May 1992.

*Transmission Systems for Communications*, Fifth Edition. Members of the Technical Staff Bell Telephone Laboratories, 1982, pp. 183 through 208.

Motorola Telecommunications Device Data, Series C, Second Printing, 1989, pp. 2–365 through 2–384.

AT&T 1988 Analog Integrated Circuits Data Book, Jun. 1988, pp. 10–1 through 10–27.

FIG. 1. PRIOR ART SPEAKERPHONE

FIG. 2. POINT-TO-POINT CONFERENCING NETWORK

FIG. 3. AUDIO SYSTEM

FIG. 4. HISTOGRAM PROCESSING

FIG. 5. STATE MACHINE PROCESSING

FIG. 6. CONTINUOUS-VARIABLE STATE DIAGRAM

FIG. 7. DISCRETE STATE MACHINE DIAGRAM

HISTOGRAM-BASED PROCESSING OF AUDIO SIGNALS

INCORPORATION BY REFERENCE

This application is a continuation-in-part of U.S. patent application Ser. No. 08/342,270, filed 11/16/94, which is a continuation-in-part of U.S. patent application Ser. No. 08/340,172, filed 11/15/94, which is a continuation-in-part of U.S. patent application Ser. No. 08/157,694, filed 11/24/93, now U.S. Pat. No. 5,506,954, all of which are incorporated herein in their entireties by reference.

BACKGROUND OF THE INVENTION

1. Field of the Invention

The present invention relates to audio conferencing, and, in particular, to computer-implemented processes and computer systems for processing audio signals for open audio systems.

2. Description of the Related Art

A traditional telephone handset places the transmitter close to the user's lips and couples the receiver tightly to the user's ear. A speakerphone or other so-called open audio systems replace the handset with a separate microphone and loudspeaker that can be set on a table a few feet from the user. One problem with speakerphones results from acoustic coupling, where the sounds produced by the loudspeaker are picked up by the local microphone and retransmitted back to the sender. The result can be an undesirable echoing in which a talker hears his own voice delayed by the transmission to and retransmission from a remote speakerphone.

One known solution to the problems of acoustic coupling and echoing is voice switching, in which only one direction of transmission is fully active at a time. Systems for achieving this one-way-at-a-time (i.e., half duplex) communication determine which direction is to be active at a given time.

Figure 1:
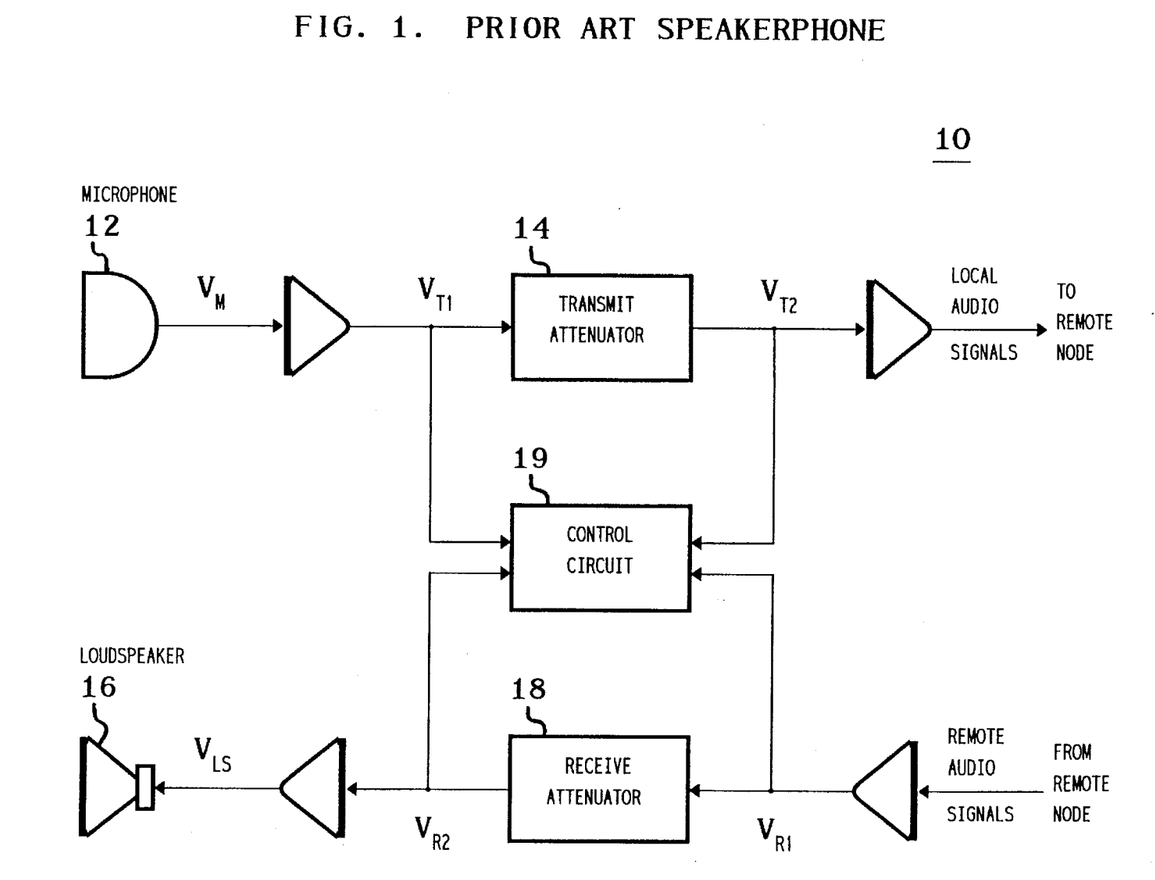
FIG. 1 is a circuit block diagram of a conventional speakerphone.

Referring now to FIG. 1, there is shown a circuit block diagram of a conventional speakerphone 10. FIG. 1 is based on FIG. 1 from the seminal article "Fundamental Considerations in the Design of a Voice-Switched Speakerphone" by A. Busala (The Bell System Technical Journal, Vol. XXXIX, No. 2, pp. 265–294, March 1960). As shown in FIG. 1, the voltage levels of local audio signals generated by microphone 12 are attenuated by transmit attenuator 14 for transmission to a remote node. Similar, the voltage levels of remote audio signals received from the remote node are attenuated by receive attenuator 18 for play at loudspeaker 16. The amount of attenuation applied by attenuators 14 and 18 is dynamically controlled by control circuit 19.

To achieve the one-way talk state in which the user of speakerphone 10 talks to the remote participant, control circuit 19 causes receive attenuator 18 to attenuate significantly the remote audio signals received from the remote node, while transmit attenuator 14 permits transmission of the local audio signals to the remote node without significant attenuation. Similarly, to achieve the one-way listen state in which the user of speakerphone 10 listens to the remote participant, control circuit 19 causes transmit attenuator 14 to attenuate significantly the local audio signals, while receive attenuator 18 permits playback of the remote audio signals without significant attenuation.

In conventional systems such as speakerphone 10, the levels of attenuation are determined based on the volumes of the participants, as indicated by the voltage (or energy) levels of the remote and local audio signals. Thus, when one conversation participant starts to speak louder than the other, control circuit 19 controls the attenuation levels of the transmit and receive attenuators 14 and 18 to switch from the talk state to the listen state, or vice versa.

One of the problems with conventional speakerphone systems relates to cutoff, where the system incorrectly or prematurely changes the direction of communication, thereby cutting a talker off before he has completed. It is desirable therefore to provide voice-switched speakerphones that avoid or at least reduce undesirable cutoffs.

It is accordingly an object of the present invention to address the problems associated with undesirable cutoffs when using speakerphones or other open audio systems that rely on voice switching to avoid acoustic coupling.

It is a particular object of the present invention to provide open audio processing for computer-based audio/video conferencing systems.

Further objects and advantages of this invention will become apparent from the detailed description of a preferred embodiment which follows.

SUMMARY OF THE INVENTION

The present invention is an apparatus for processing audio signals. According to a preferred embodiment, the apparatus comprises (a) a transmit attenuator for attenuating local audio signals generated by a local microphone for transmission to a remote node; (b) a receive attenuator for attenuating remote audio signals received from the remote node for playback at a local speaker; and (c) a controller, electrically connected to the transmit attenuator and the receive attenuator, for controlling a level of transmit attenuation for the transmit attenuator and a level of receive attenuation for the receive attenuator. The controller generates a local histogram based on the local audio signals. The controller uses the local histogram to generate the level of transmit attenuation and the level of receive attenuation.

The present invention is also a computer-implemented process for processing audio signals. According to a preferred embodiment, a local histogram is generated with a controller based on local audio signals generated with a local microphone. A level of transmit attenuation and a level of receive attenuation are generated with the controller based on the local histogram. The local audio signals are attenuated with a transmit attenuator at the level of transmit attenuation for transmission to a remote node. Remote audio signals received from the remote node are attenuated with a receive attenuator at the level of receive attenuation for playback at a local speaker.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Figure 2:
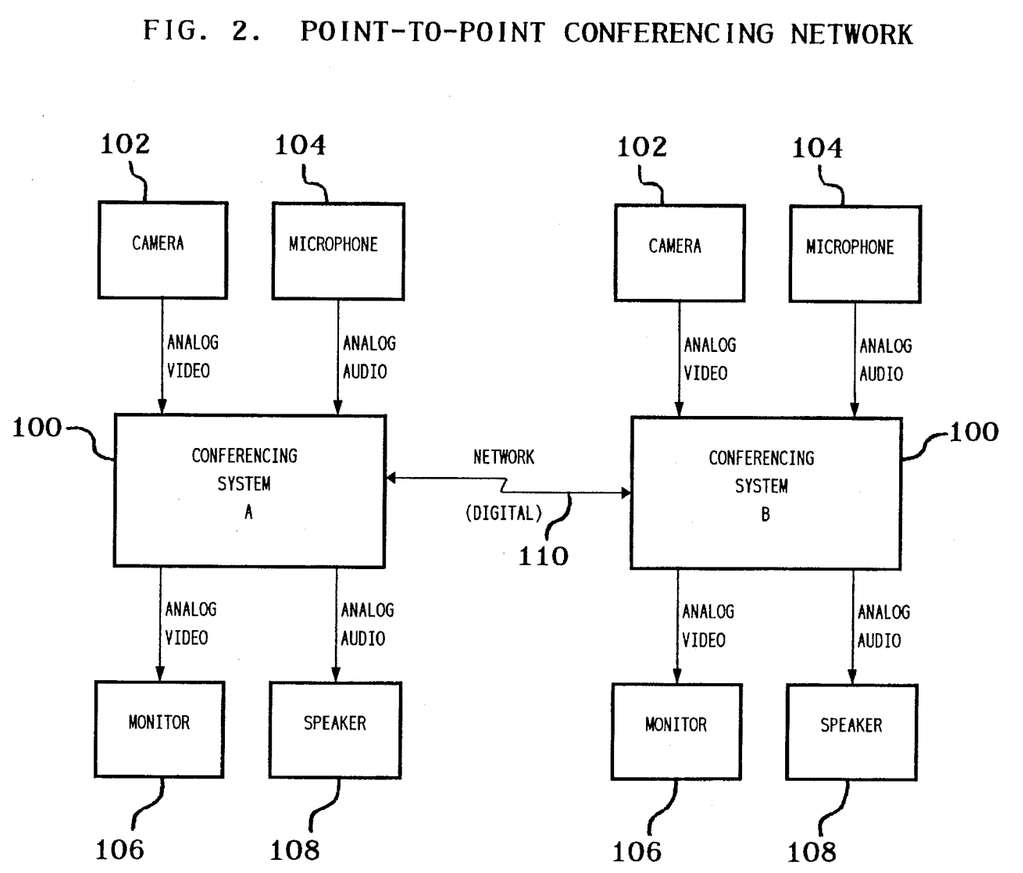
FIG. 2 is a block diagram representing real-time point-to-point audio/video conferencing between two computer-based conferencing systems, according to an embodiment of the present invention.

Referring now to FIG. 2, there is shown a block diagram representing real-time point-to-point audio/video conferencing between two computer-based conferencing nodes, according to one embodiment of the present invention. Each PC node has a conferencing system 100, a camera 102, a microphone 104, a monitor 106, and a speaker 108. The conferencing nodes communicate via a digital network 110. Each conferencing system 100 receives, digitizes, and compresses the analog video signals generated by camera 102 and the analog audio signals generated by microphone 104. The compressed digital video and audio signals are transmitted to the other conferencing node via network 110, where they are decompressed and converted for play on monitor 106 and speaker 108, respectively.

Conferencing system 100 may be any suitable conferencing system and is preferably an Intel® microprocessor-based computer system configured with Intel® ProShare™ conferencing software and hardware. Microphone 104 may be any suitable microphone for generating analog audio signals. Speaker 108 may be any suitable device for playing analog audio signals.

Digital network 110 may be any suitable network for transmitting digital signals between the conferencing nodes. In one embodiment of the present invention, digital network 110 is an ISDN network. In other embodiments, digital network 110 may be other types of networks, such as a local or wide area network.

Figure 3:
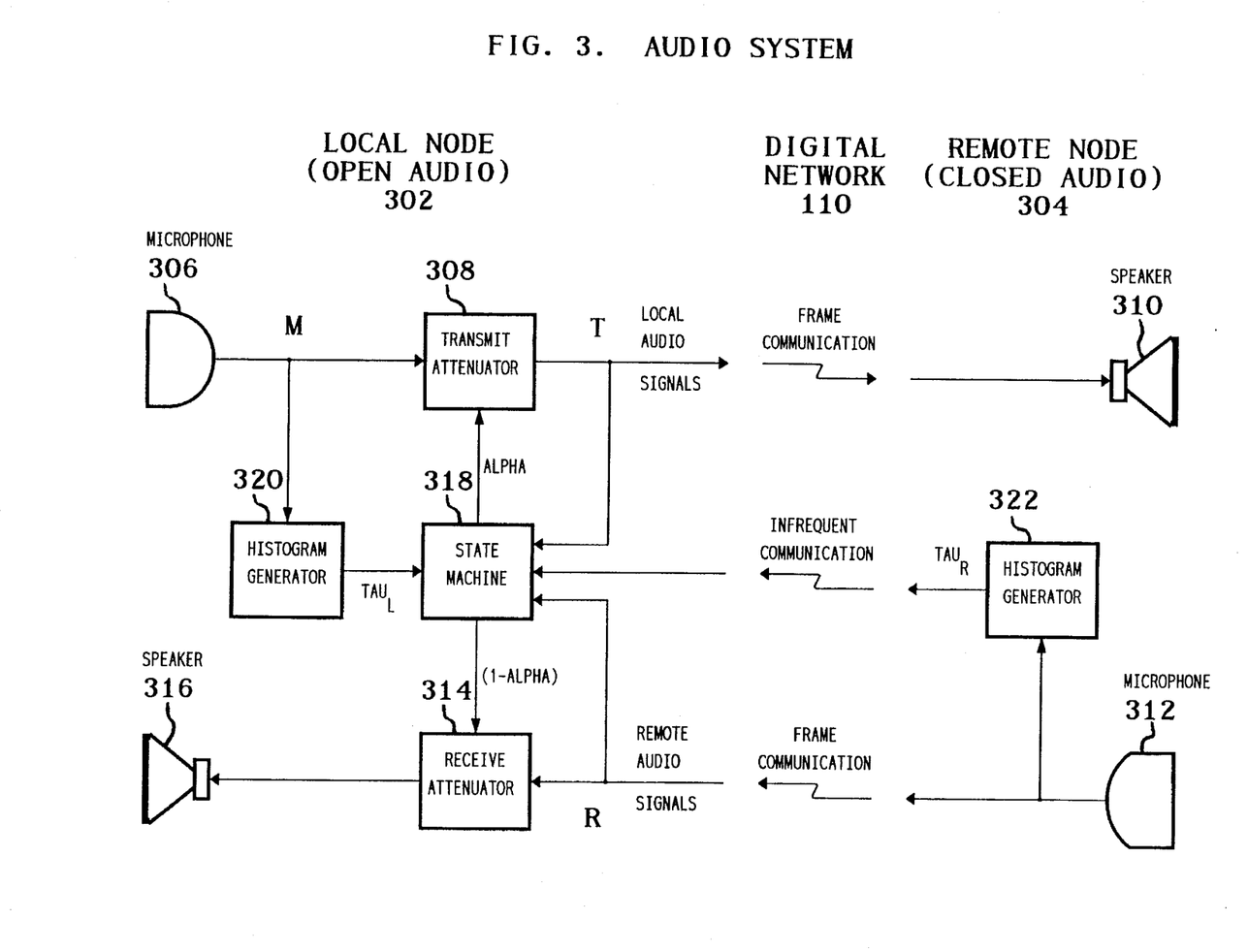
FIG. 3 is a circuit block diagram of the audio systems of the local and remote nodes of the conferencing network of FIG. 2.

Referring now to FIG. 3, there is shown a circuit block diagram of the audio systems of the local and remote nodes of the conferencing network of FIG. 2. FIG. 3 represents conferencing in which the local node 302 is configured with an open audio system (e.g., a speakerphone) while the remote node 304 is configured with a closed audio system (e.g., a telephone handset or headset). In an alternative embodiment of the present invention, both local and remote nodes may be configured with open audio systems. The audio processing of FIG. 3 is distributed in that there is an instantiation of the audio processing on each of the conference nodes connected by the digital network 110 and the audio processing on one node is interdependent of the audio processing on the other node.

Local audio signals generated by microphone 306 of local node 302 are attenuated by transmit attenuator 308 for transmission over network 110 to remote node 304, where they are played back at speaker 310. Remote audio signals, generated by microphone 312 of remote node 304 and received by local node 302 over network 110, are attenuated by receive attenuator 314 for playback at speaker 316. State machine 318 controls the level of attenuation ($\alpha$) applied by transmit attenuator 308 to the local audio stream and the level of attenuation ($1-\alpha$) applied by receive attenuator 314 to the remote audio stream.

State machine 318 determines these attenuation levels based on the energy levels of the local and remote audio streams (which indicate levels of audio volume) and on histogram information for the local and remote audio streams. In one embodiment of the present invention, the energy levels are based on the mean sum of the squares of the digitized audio signals within a particular time period (i.e., audio frame). The histogram information is used to characterize the energy levels of the background noise of the local and remote audio streams, which in turn are used to determine when the conference participants are talking. The histogram information for the local audio stream is generated by histogram generator 320 of local node 302. The histogram information for the remote audio stream is generated by histogram generator 322 of remote node 304 and received by state machine 318 over network 110.

Figure 4:
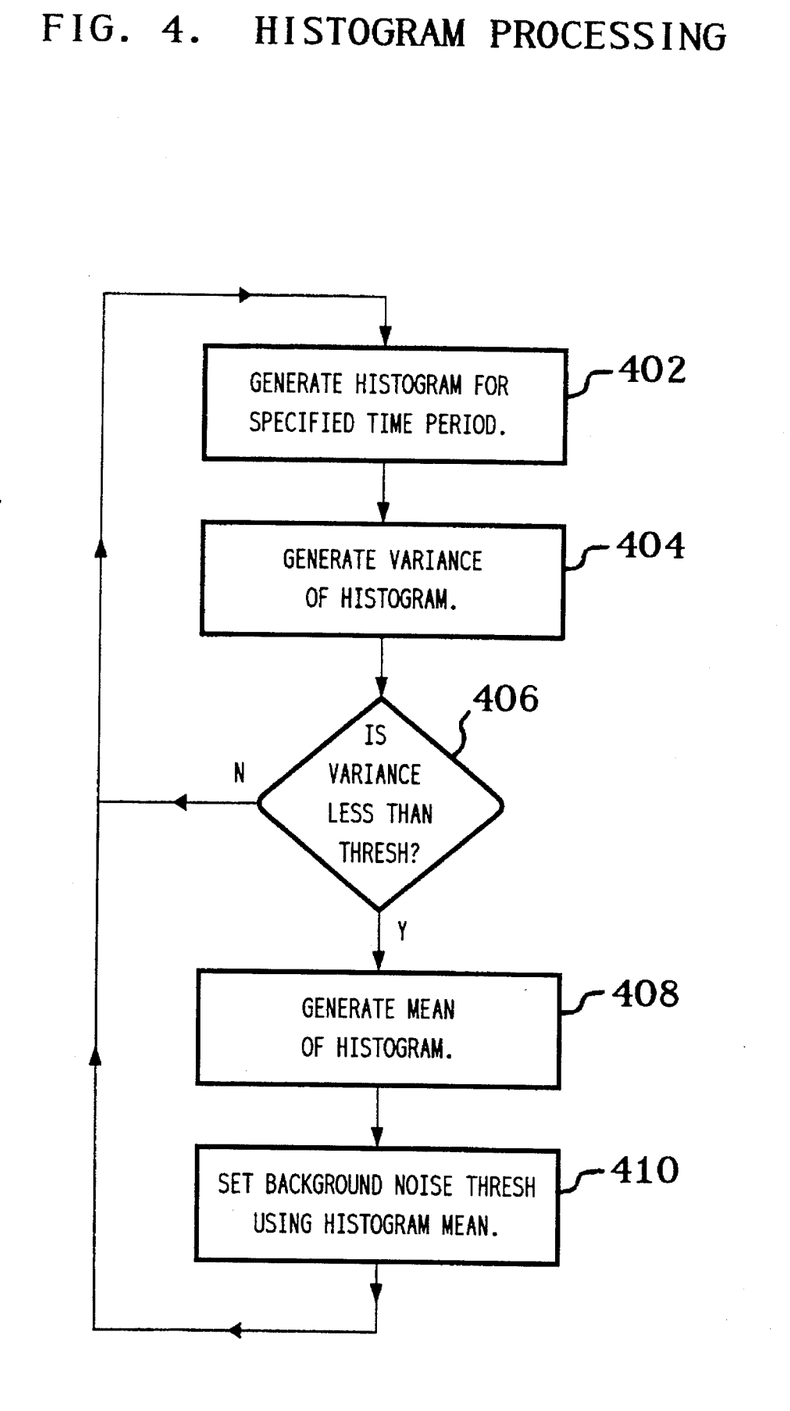
FIG. 4 is a process flow diagram of processing implemented by the histogram generators of FIG. 3.

Referring now to FIG. 4, there is shown a process flow diagram of processing implemented by histogram generator 320 of FIG. 3 for the local audio stream. Histogram generator 320 uses the local audio signals that are generated by microphone 306 over a specified period of time (e.g., 5 seconds) to generate a local histogram (step 402 of FIG. 4). In one embodiment of the present invention, the histogram is logarithm based where each histogram bin corresponds to a specified range of decibels (dB). Histogram generator 320 divides the local audio signals for the previous time period into a plurality of audio frames (e.g., one audio frame=20 msec of audio signals). The histogram is generated by filling the histogram bins based on the energies of the individual audio frames.

After generating the local histogram for the specified time period, histogram generator 320 generates the variance of the local histogram (step 404). The variance is used to determine whether the local audio signals for the previous time period correspond to background noise alone or background noise plus talking. In the paradigm for audio conferencing, background noise is assumed to be relatively uniform, white noise. In this paradigm, when a conference participant is not talking, the histogram variance is relatively small. On the other hand, the histogram variance is relatively large when a conference participant is talking.

Therefore, if the local histogram variance for the previous time period is less than a specified variance threshold (e.g., 3 dB) (step 406), then the local audio signals are assumed to correspond to background noise alone. In this case, the mean of the local histogram is generated (step 408) and used to establish a local background noise threshold (step 410). In one embodiment, the local background noise threshold is 5 dB greater than the local histogram mean. This local background noise threshold is retained and used by state machine 318 to control the transmit and receive attenuators 308 and 314 (as described below).

If, on the other hand, the local histogram variance is not less than the variance threshold (step 406), then the local audio signals for the previous time period are assumed to correspond to background noise plus talking. In this case, the local background noise threshold is not updated and processing returns to step 402. Histogram generator 320 continues to generate and analyze histograms for subsequent time periods to determine whether to update the local background noise threshold.

In the embodiment of FIG. 3, histogram generator 322 of remote node 304 uses processing analogous to that of FIG. 4 to generate a remote histogram for the remote audio signals that are generated by microphone 312 and a remote background noise threshold indicative of the background noise level at remote node 304. In the embodiment of FIG. 3 in which remote node 304 is a closed audio system, the remote background noise threshold is preferably 20 dB greater than the mean of a remote histogram that corresponds to background noise alone. In an alternative embodiment in which both the local and remote nodes are open audio systems, the remote background noise threshold is preferably 5 dB greater than the mean of the remote histogram. The thresholds for open and closed audio systems are selected differently because, in the open audio system, the talker is typically further away from the microphone than in the closed audio system. Histogram generator 322 transmits the remote background noise threshold to state machine 318 over network 110.

In an alternative embodiment of the present invention, the remote node has no histogram generator. In this embodiment, the local node generates its own histogram for the remote audio signals received over the network 110 and does its own histogram analysis analogous to the processing of FIG. 4 to generate the remote background noise threshold for the remote audio signals.

Figure 5:
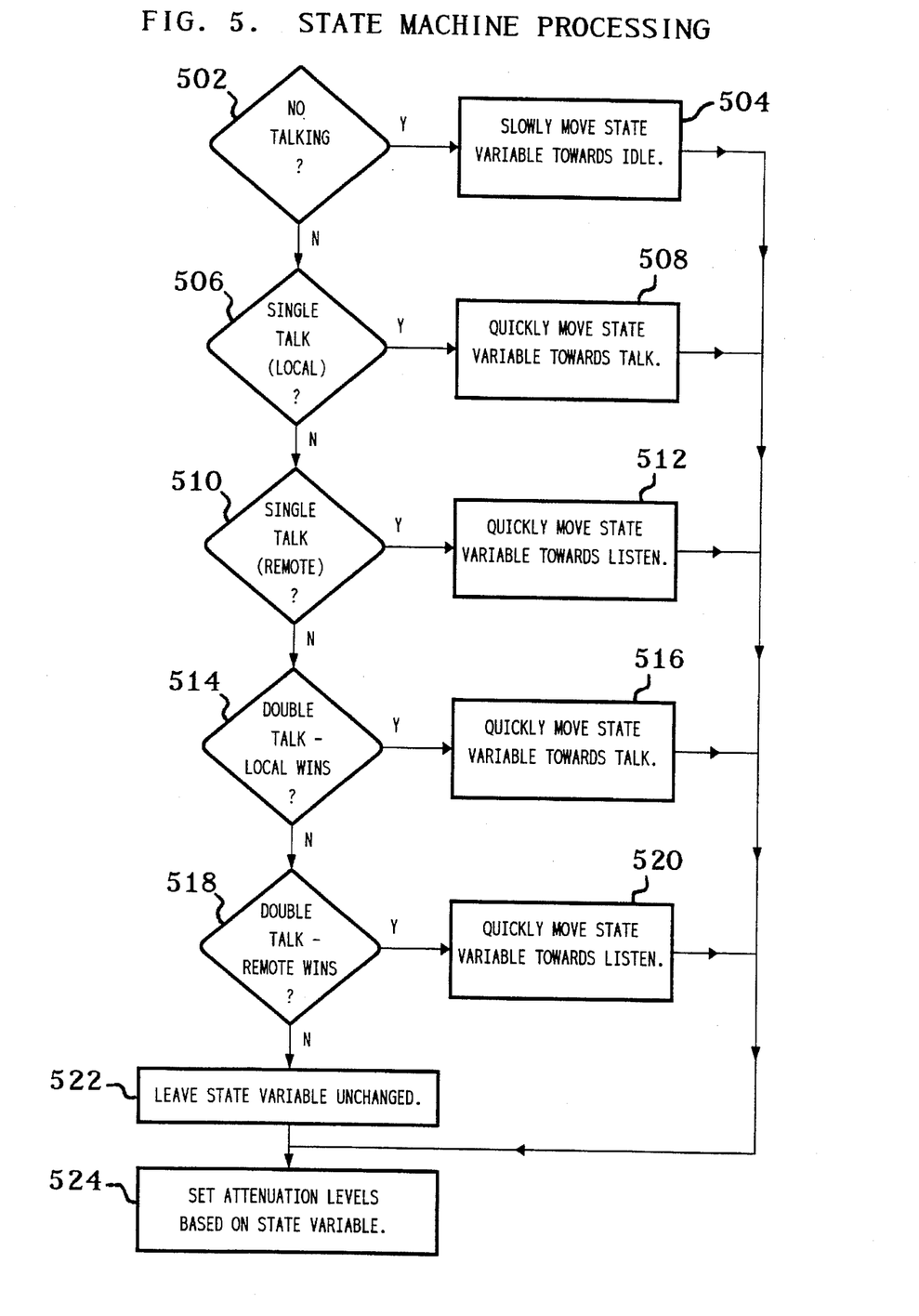
FIG. 5 is a process flow diagram of processing implemented by the state machine of FIG. 3 for each pair of frames of local and remote audio signals to control the attenuation levels of the transmit and receive attenuators of FIG. 3, according to one embodiment of the present invention.

Referring now to FIG. 5, there is shown a process flow diagram of processing implemented by state machine 318 of FIG. 3 for each pair of audio frames (consisting of one frame of local audio signals and one frame of remote audio signals) to control the attenuation levels of transmit and receive attenuators 308 and 314, according to one embodiment of the present invention. In this embodiment, state machine 318 maintains a single continuous state variable i which is used to set the transmit and receive attenuation levels. The state variable i can assume any value between $-j$ and $j$, where $j$ is a specified constant (e.g., 8).

Figure 6:
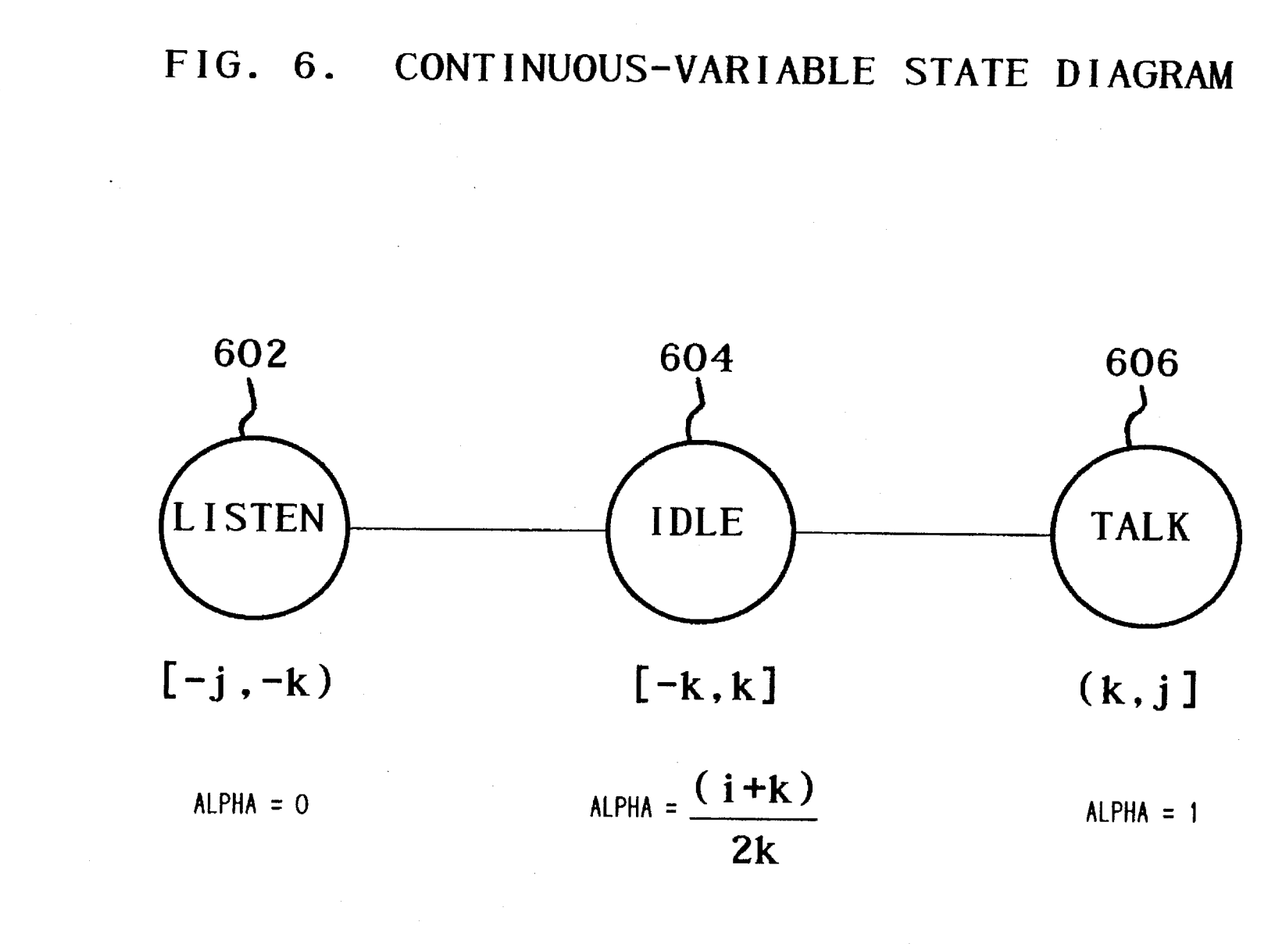
FIG. 6 is a state diagram for the state machine of FIG. 3 for the processing of FIG. 5.

Referring now to FIG. 6, there is shown a state diagram for state machine 318 of FIG. 3 for the processing of FIG. 5. When the state variable i is between $-j$ and $-k$, where $k$ is a specified constant less than $j$ (e.g., 2), state machine 318 is in the listen state 602 and the attenuators are configured to permit the local user to listen to the remote user talk. When the state variable i is between $k$ and $j$, state machine 318 is in the talk state 606 and the attenuators are configured to permit the local user to talk to the remote user. When the state variable i is between $-k$ and $k$, state machine 318 is in the idle state 604. The idle state is a transition state between the listen and talk states in which the attenuators are configured to allow both local and remote users to talk.

State machine 318 analyzes the energy levels of the attenuated local audio signals T and the remote audio signals R (as shown in FIG. 3) for the most recent local and remote audio frames to determine the current mode of audio conferencing. There are five different audio conferencing modes, defined as follows:

No Talking: $(T \leq \tau_L) \& (R \leq \tau_R)$

Single Talk (Local): $(T > \tau_L) \& (R \leq \tau_R)$

Single Talk (Remote): $(T \leq \tau_L) \& (R > \tau_R)$

Double Talk (Local Wins): $(T > \tau_L) \& (R > \tau_R) \& (T > R+D1)$

Double Talk (Remote Wins): $(T > \tau_L) \& (R > \tau_R) \& (R > T+D2)$ where $\tau_L$ is the local background noise threshold, $\tau_R$ is the remote background noise threshold, and D1 and D2 are threshold parameters (e.g., 10 dB for both D1 and D2).

Referring again to FIG. 5, if the current audio conferencing mode is the no talking mode (step 502), then state machine 318 slowly moves the state variable i towards the idle state (step 504). To move slowly towards the idle state, if the state variable i is greater than 0, then state machine 318 decrements the state variable i by 1, and, if the state variable i is less than 0, then state machine 318 increments the state variable i by 1. If the state variable i is equal to zero, then it is left unchanged.

If the current audio conferencing mode is the single talk (local) mode (step 506), then state machine 318 quickly moves the state variable i towards the talk state (step 508). To move quickly towards the talk state, state machine 318 increments the state variable i by 1, where 1 is a specified constant greater than k (e.g., l=10) and where the state variable i cannot be greater than j.

If the current audio conferencing mode is the single talk (remote) mode (step 510), then state machine 318 quickly moves the state variable i towards the listen state (step 512). To move quickly towards the listen state, state machine 318 decrements the state variable i by 1, where the state variable i cannot be less than $-j$.

If the current audio conferencing mode is the double talk (local wins) mode (step 514), then state machine 318 quickly moves the state variable i towards the talk state (step 516). If the current audio conferencing mode is the double talk (remote wins) mode (step 518), then state machine 318 quickly moves the state variable i towards the listen state (step 520). Otherwise, state machine 318 leaves the state variable i unchanged (step 522).

After determining the current audio conferencing mode and adjusting the state variable i accordingly, state machine 318 sets the transmit and receive attenuation levels based on the state variable i (step 524). In one embodiment of the present invention, the sum of the transmit and receive attenuation levels always correspond to unity gain. In this embodiment, the attenuation level for transmit attenuator 308 of FIG. 3 may be represented by $\alpha$ and the attenuation level for receive attenuator 314 may be represented by $(1-\alpha)$.

As shown in FIG. 6, when the state variable i is less than $-k$, then state machine 318 is in the listen state 602 and state machine 318 sets $\alpha$ equal to 0. As such, the attenuation level or transmit attenuator 308 is 0 and the attenuation level of receive attenuator 314 is 1. In this configuration, the local audio signals generated by microphone 306 are fully attenuated and the remote audio signals are unattenuated to permit them to be played back at speaker 316, thereby achieving one-way (i.e., half duplex) communication.

When the state variable i is greater than k, then state machine 318 is in the talk state 606 and state machine 318 sets $\alpha$ equal to 1. As such, the attenuation level of transmit attenuator 308 is 1 and the attenuation level of receive attenuator 314 is 0. In this configuration, the local audio signals are unattenuated and the remote audio signals are fully attenuated to prevent them from being played back at speaker 316, thereby achieving one-way communication.

When the state variable i is between $-k$ and $k$, then state machine 318 is in the idle state 604 and state machine 318 sets $\alpha$ as shown in the following Equation (1):

$$\alpha = (i+k)/2k \qquad (1)$$

In this configuration, both the local and remote audio signals are partially attenuated. The idle state provides a continuous linear transition for $\alpha$ between the listen and talk states, where $\alpha$ varies from 0 (for $i=-k$) to 1 (for $i=k$).

Figure 7:
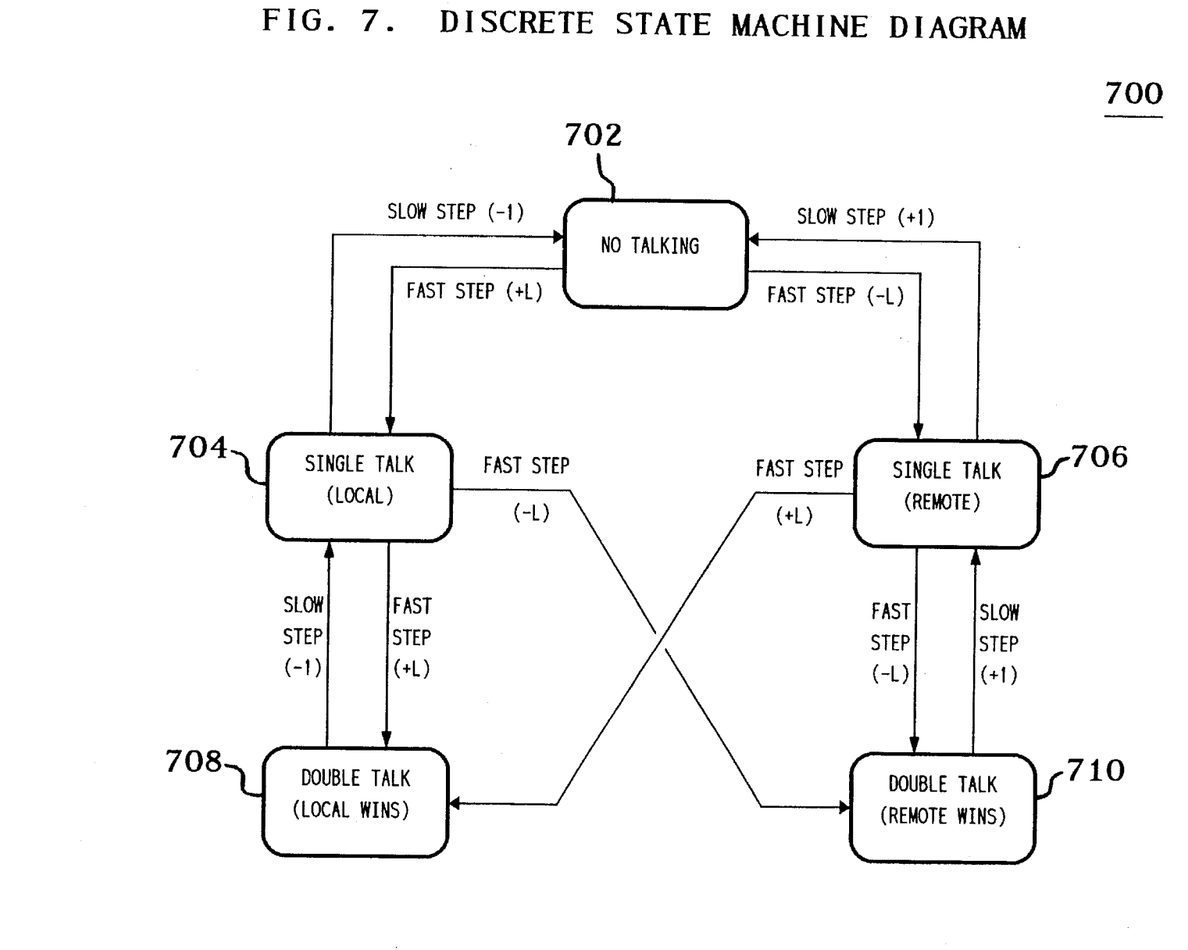
FIG. 7 is a diagram of a discrete state machine, according to an alternative embodiment of the state machine of FIG. 3.

Referring now to FIG. 7, there is shown a diagram of a discrete state machine 700, according to an alternative embodiment of state machine 318 of FIG. 3. Discrete state machine 700 comprises the following five states defined by the present five sets of conditions:

(1) No Talking state 702: $(T \leq \tau_L) \& (R \leq \tau_R)$ (2) Single Talk (Local) state 704: $(T > \tau_L) \& (R \leq \tau_R)$ (3) Single Talk (Remote) state 706: $(T \leq \tau_L) \& (R > \tau_R)$ (4) Double Talk (Local Wins) state 708: $(T > \tau_L) \& (R > \tau_R) \& ([(T - \tau_L) - (R - \tau_R)] > D1)$ (5) Double Talk (Remote Wins) state 710: $(T > \tau_L) \& (R > \tau_R) \& [(R - \tau_R) - (L - \tau_L)] > D2)$ where T is the energy of the current frame of attenuated local audio signals, R is the energy of the current frame of remote audio signals, $\tau_L$ is the local background noise threshold, $\tau_R$ is the remote background noise threshold, and D1 and D2 are threshold parameters (e.g., 10 dB for both D1 and D2).

As shown in FIG. 7, the possible transitions between states in discrete state machine 700 are limited to the following:

From No Talking state 702 to either Single Talk (Local) state 704 or Single Talk (Remote) state 706;

From Single Talk (Local) state 704 to either No Talking state 702, Double Talk (Local Wins) state 708, or Double Talk (Remote Wins) state 710;

From Single Talk (Remote) state 706 to either No Talking state 702, Double Talk (Local Wins) state 708, or Double Talk (Remote Wins) state 710;

From Double Talk (Local Wins) state 708 to only Single Talk (Local) state 704; and From Double Talk (Remote Wins) state 710 to only Single Talk (Remote) state 706.

Thus, for example, if the state for the previous cycle was the No Talking state 702, then, during the current cycle, the processing for discrete state machine 700 needs only determine whether the conditions for either the Single Talk (Local) state 704 or the Single Talk (Remote) state 706 are met. If one of those two sets of conditions are met, then the corresponding state transition will occur. Those skilled in the art will understand that this discrete state machine processing differs from the linear state machine processing of FIG. 5 in which the conditions for all five modes may need to be checked in a given cycle.

In one embodiment of the present invention, the transmit and receive attenuation levels for an audio system using discrete state machine 700 of FIG. 7 are determined in the same manner as the transmit and receive attenuation levels that were described earlier for the audio system using the state machine processing of FIG. 5. That is, the transmit attenuation level $\alpha$ and the receive attenuation level $(1-\alpha)$ are based on the state variable i and constant k, where:

for $i < -k$, $\alpha = 0$ for $-k \leq i \leq k$, $\alpha = (i + k)/2k$ for $k < i$, $\alpha = 1$ and where i is limited to the range $(-j, j)$. In one embodiment, (j=8) and (k=2).

When a state transition occurs (and only when a state transition occurs), the state variable i is incremented (or decremented). The change to the state variable i for each of the allowable state transitions is indicated in FIG. 7 as either a slow step or a fast step. In one embodiment of the present invention, the slow step has a magnitude of 1 and the fast step has a magnitude of l, where l is greater than k (e.g., l=10).

Those skilled in the art will understand that, in addition to the audio processing described above, local node 302 of FIG. 3 may also compress the local audio signals for transmission to the remote node and decompress compressed remote audio signals for playback.

It will also be understood that alternative embodiments of the present invention may be based on the pre-attenuated local audio signals M of FIG. 3 rather than on the attenuated local audio signals T.

In one embodiment of the present invention, the network 110 of FIG. 3 is an ISDN network. In this embodiment, the local and remote audio signals are transmitted between the nodes over the B channels of the ISDN network. To avoid redundant operations between the two nodes and to avoid audio codec distortions to the energy levels, the audio frame energy (T or R) is embedded within a field of the communication format that carries the digitally compressed audio signals for each frame. The following information is transmitted infrequently over the B channels of the ISDN network:

The local background noise threshold $\tau_L$ sent from the local node to the remote node; and The remote background noise threshold $\tau_R$ sent frown the remote node to the local node.

The infrequent communications are transmitted less frequently than the frame communications (e.g., typically every 5 seconds rather than every 20 milliseconds).

In the embodiment shown in FIG. 3, the local node is an open audio system while the remote node is a closed audio system. In another embodiment of the present invention, both nodes are open audio systems, in which case the remote node performs processing analogous to that described above for the local node. In this latter embodiment, the local background noise threshold $\tau_L$ is transmitted from the local node to the remote node in addition to the remote background noise threshold $\tau_R$ being transmitted from the remote node to the local node.

In yet another embodiment of the present invention, the remote node does not have a histogram generator. In this embodiment, the local node performs the histogram analysis of the remote audio stream received from the remote node to generate and update the remote background noise threshold.

Those skilled in the art will understand that the audio systems of the present invention permit two personal computer (PC) based nodes connected by a digital network to carry on an audio conversation utilizing microphones and speakers without having to resort to other measures which limit or eliminate acoustic feedback or coupling from speaker to microphone. As such, there is no need for an audio headset or similar device to eliminate acoustic coupling. Nor is a commercial speakerphone attachment (i.e., a separate dedicated circuit device) needed which would perform the audio processing off the PC and would add cost and complexity to the system.

The present invention works with any configuration of one or more microphones and one or more speakers and not just with a commercial speakerphone in which the microphone and speaker are fixed within an enclosure.

It will also be understood that, by transmitting threshold and energy level information between the nodes, the present invention effectively distributes computational overhead among the nodes such that redundant signal processing (e.g., generation of signal volumes and background noise thresholds) is eliminated. This also helps make the nodes immune to any losses or distortions that may result from the compression and decompression processing.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for processing audio signals, comprising:

(a) a transmit attenuator for attenuating local audio signals generated by a local microphone for transmission to a remote node;

(b) a receive attenuator for attenuating remote audio signals received from the remote node for playback at a local speaker; and (c) a controller, electrically connected to the transmit attenuator and the receive attenuator, for controlling a level of transmit attenuation for the transmit attenuator and a level of receive attenuation for the receive attenuator, wherein:

the controller generates a local histogram based on the local audio signals; and the controller uses the local histogram to generate the level of transmit attenuation and the level of receive attenuation.

2. The apparatus of claim 1, wherein:

the controller uses the local histogram to generate a level of local background noise; and the controller uses the level of local background noise to generate the levels of transmit and receive attenuation.

3. The apparatus of claim 2, wherein:

the controller generates an updated level of local background noise, if a variance of the local histogram is less than a specified local threshold; and the controller uses the updated level of local background noise to generate the levels of transmit and receive attenuation.

4. The apparatus of claim 3, wherein the controller generates the updated level of local background noise based on a mean of the local histogram.

5. The apparatus of claim 1, wherein the controller generates the local histogram based on energy levels of audio frames of the local audio signals.

6. The apparatus of claim 1, wherein the controller generates the local histogram as a logarithm-based histogram.

7. The apparatus of claim 1, wherein:

the controller receives, from the remote node, remote audio information corresponding to the remote audio signals, wherein the remote audio information was generated by the remote node from a remote histogram generated by the remote node based on the remote audio signals; and the controller uses the remote audio information and the local histogram to generate the levels of transmit and receive attenuation.

8. The apparatus of claim 7, wherein:

the remote audio information comprises a level of remote background noise; and the controller uses the level of remote background noise and the local histogram to generate the levels of transmit and receive attenuation.

9. The apparatus of claim 1, wherein:

the controller generates a remote histogram based on the remote audio signals; and the controller uses the local histogram and the remote histogram to generate the levels of transmit and receive attenuation.

10. The apparatus of claim 9, wherein:

the controller uses the local histogram to generate a level of local background noise;

the controller uses the remote histogram to generate a level of remote background noise; and the controller uses the level of local background noise and the level of remote background noise to generate the levels of transmit and receive attenuation.

11. The apparatus of claim 10, wherein:

the controller generates an updated level of local background noise, if a variance of the local histogram is less than a specified local threshold;

the controller generates an updated level of remote background noise, if a variance of the remote histogram is less than a specified remote threshold; and the controller uses the updated levels of local and remote background noise to generate the levels of transmit and receive attenuation.

12. The apparatus of claim 11, wherein:

the controller generates the updated level of local background noise based on a mean of the local histogram; and the controller generates the updated level of remote background noise based on a mean of the remote histogram.

13. The apparatus of claim 1, wherein:

the controller generates the local histogram as a logarithm-based histogram based on energy levels of audio frames of the local audio signals;

the controller uses the local histogram to generate a level of local background noise;

the controller receives, from the remote node, a level of remote background noise, wherein the level of remote background noise was generated by the remote node from a remote histogram generated by the remote node based on the remote audio signals; and the controller uses the level of local background noise and the level of remote background noise to generate the levels of transmit and receive attenuation.

14. The apparatus of claim 13, wherein:

the controller generates an updated level of local background noise based on a mean of the local histogram, if a variance of the local histogram is less than a specified local threshold; and the controller uses the updated level of local background noise and the level of remote background noise to generate the levels of transmit and receive attenuation.

15. A computer-implemented process for processing audio signals, comprising the steps of:

(a) generating, with a controller, a local histogram based on local audio signals generated with a local microphone;

(b) generating, with the controller, a level of transmit attenuation and a level of receive attenuation based on the local histogram;

(c) attenuating, with a transmit attenuator at the level of transmit attenuation, the local audio signals for transmission to a remote node; and (d) attenuating, with a receive attenuator at the level of receive attenuation, remote audio signals received from the remote node for playback at a local speaker.

16. The process of claim 15, wherein step (b) comprises the steps of:

(1) generating a level of local background noise based on the local histogram; and (2) generating the levels of transmit and receive attenuation based on the level of local background noise.

17. The process of claim 16, wherein step (b) comprises the steps of:
(1) generating an updated level of local background noise, if a variance of the local histogram is less than a specified local threshold; and
(2) generating the levels of transmit and receive attenuation based on the updated level of local background noise.

18. The process of claim 17, wherein step (b)(1) comprises the step of generating the updated level of local background noise based on a mean of the local histogram.

19. The process of claim 15, wherein step (a) comprises the step of generating the local histogram based on energy levels of audio frames of the local audio signals.

20. The process of claim 15, wherein step (a) comprises the step of generating the local histogram as a logarithm-based histogram.

21. The process of claim 15, wherein step (b) comprises the steps of:
(1) receiving, by the controller from the remote node, remote audio information corresponding to the remote audio signals, wherein the remote audio information was generated by the remote node from a remote histogram generated by the remote node based on the remote audio signals; and
(2) generating the levels of transmit and receive attenuation using the remote audio information and the local histogram.

22. The process of claim 21, wherein:
the remote audio information comprises a level of remote background noise; and
step (b)(2) comprises the step of generating the levels of transmit and receive attenuation using the level of remote background noise and the local histogram.

23. The process of claim 15, wherein:
step (a) further comprises the step of generating, with the controller, a remote histogram based on the remote audio signals; and
step (b) comprises the step of generating the levels of transmit and receive attenuation using the local histogram and the remote histogram.

24. The process of claim 23, wherein step (b) comprises the steps of:
(1) generating a level of local background noise using the local histogram;
(2) generating a level of remote background noise using the remote histogram; and
(3) generating the levels of transmit and receive attenuation using the level of local background noise and the level of remote background noise.

25. The process of claim 24, wherein step (b) comprises the steps of:
(1) generating an updated level of local background noise, if a variance of the local histogram is less than a specified local threshold;
(2) generating an updated level of remote background noise, if a variance of the remote histogram is less than a specified remote threshold; and
(3) generating the levels of transmit and receive attenuation using the updated levels of local and remote background noise.

26. The process of claim 25, wherein:
step (b)(1) comprises the step of generating the updated level of local background noise based on a mean of the local histogram; and
step (b)(2) comprises the step of generating the updated level of remote background noise based on a mean of the remote histogram.

27. The process of claim 15, wherein:
step (a) comprises the step of generating the local histogram as a logarithm-based histogram based on energy levels of audio frames of the local audio signals; and
step (b) comprises the steps of:
(1) generating a level of local background noise using the local histogram;
(2) receiving, by the controller from the remote node, a level of remote background noise, wherein the level of remote background noise was generated by the remote node from a remote histogram generated by the remote node based on the remote audio signals; and
(3) generating the levels of transmit and receive attenuation using the level of local background noise and the level of remote background noise.

28. The process of claim 27, wherein:
step (b)(1) comprises the step of generating an updated level of local background noise based on a mean of the local histogram, if a variance of the local histogram is less than a specified local threshold; and
step (b)(3) comprises the step of generating the levels of transmit and receive attenuation using the updated level of local background noise and the level of remote background noise.

* * * * *